UNITED STATES PATENT OFFICE.

AXEL FRANCK-PHILIPSON, OF CHICAGO, ILLINOIS.

METHOD OF PRODUCING SOLIDIFIED SOLUBLE DISINFECTANT.

1,392,564. Specification of Letters Patent. Patented Oct. 4, 1921.

No Drawing. Application filed March 15, 1918, Serial No. 222,580. Renewed March 20, 1920. Serial No. 367,428.

*To all whom it may concern:*

Be it known that I, AXEL FRANCK-PHILIPSON, subject of the King of Denmark, residing at Chicago, in the county of Cook and State of Illinois, have invented certain new and useful Improvements in Methods of Producing Solidified Soluble Disinfectant; and I do hereby declare the following to be a full, clear, and exact description of the invention, such as will enable others skilled in the art to which it appertains to make and use the same.

This invention relates to a novel method of producing a readily soluble solidified disinfectant containing a large percentage of coal tar derivative of known disinfectant qualities, which, when immersed in a quantity of water, will readily dissolve without stirring or other agitation by a species of eruption and will form a permanent emulsion with the water, and which is adapted for use for washing and cleansing purposes generally without presenting a disagreeable odor or leaving an undesirable scum.

A further object of the invention is to provide a disinfectant of the character aforesaid which is of such concentrated strength that a very small volume of the product will produce a very large volume of a liquid disinfectant of so-called standard strength.

The invention consists in mixing tar oil, sometimes called "coal tar oil" with a solution of caustic soda of a strength of about forty degrees Baumé and boiling the same for a period of an hour, more or less, while continuously stirring and agitating the mixture. This mixture consists of seven parts, more or less, tar oil to three parts, more or less, caustic soda solution, though solutions of soda ash or other alkalis adapted for neutralization of the free acids of said oil may be used. While this mixture is still boiling I add thereto substantially one part of a vegetable or animal fat, preferably in the nature of a solid oil, such, for example, as cocoanut oil, (which is preferred), or stearic acid, to substantially three parts, more or less, of the liquid mixture, and continue to boil the same for a period of ten to fifteen minutes, more or less, while constantly stirring the same. I add to this solution sufficient caustic soda or other alkali adapted to the purpose, to saponify or partially saponify the fat and render the entire compound substantially neutral.

The strength of the caustic soda solution is not material, it being essential only that sufficient caustic soda should be added to the tar oil to effect neutralization of the free acids thereof and that no excess of caustic soda be present in the finished product. A weaker solution than above indicated will necessitate longer boiling to condense the compound while a stronger solution will cause the excess water to be evaporated out too soon to secure the best results. It is preferable to retain some water in the finished product.

While this compound is still liquid I add thereto a saturated solution, of a suitable soluble disinfecting salt such, for example, as an oxalate of sodium or potassium in quantity equal to from one-fourth of one per cent. (.0025) to two per cent. (.02) of the liquid depending upon the disinfecting strength or co-efficient desired. The oxalates of sodium or potassium are very powerful disinfectants and the addition of such a salt renders the whole compound far more efficient to perform its functions than if omitted. While sodium or potassium oxalate is preferred, any well known soluble disinfecting salt adapted to the purpose, may be used.

After the last-named saturated solution has been added and thoroughly stirred into the mass the same is allowed to cool and solidify, being preferably poured into suitable molds to form cakes of suitable dimensions. These cakes, when solidified, will not melt at a temperature less than approximately 120° Fahr., thus rendering them well adapted for shipment in paper cartons.

When dropped into water these cakes will readily dissolve without stirring or agitation by a species of eruption or effervescence. When a piece of the solid is dropped into a glass of water a smoke-like stream issues therefrom which rises toward the top but forms a perfect and permanent emulsion with the water. Its action in solution is very similar to, though not as violent as, that of effervescent tablets and differs from the latter in that the seemingly effervescent action is due to the escape of the minute globules of neutralized tar oil from the less readily soluble saponified animal or vegetable oil.

The concentrated strength of the cakes is such that one pound thereof will, when dissolved in twenty-five gallons of water, produce approximately the last-named quantity of liquid disinfectant of standard strength.

The proportions above given are by weight.

The disinfecting salt, or its equivalent, may be omitted with the result that the disinfecting efficiency is proportionately decreased. The aforesaid oxalates of sodium or potassium are preferred because they are neither caustic nor etching and will not when added to the compound in the proportions stated irritate the skin or effect any discoloration of the emulsion and consequent tinting of the surfaces to which the same is applied.

The emulsion resulting from the solution of the mass in water has a very agreeable odor and does not leave any undesirable scum on the surfaces to which it is applied. It may be used on the person and on clothing worn without any disagreeable effect.

The foregoing succession of steps is not essential and may be reversed in that the fat is first saponified or partially saponified and the tar oil and further caustic soda solution or the like then added. The saponified fat constitutes the solidifying element of the finished product, forming, it is believed, a cellular structure which retains the liquid neutralized tar oil in a very finely divided state in its cells or pores.

I claim as my invention:

1. The method of producing a disinfectant of the character set forth which consists in commingling tar oil with an alkali to neutralize the free acids thereof, and also with a fat and saponifying or partially saponifying the latter, and thereupon condensing the mixture to effect solidification thereof when cold.

2. The method of producing a disinfectant of the character set forth which consists in commingling tar oil with an alkali to neutralize the free acids thereof, and also with a fat in the presence of heat and agitation to saponify the fat and condense the mixture to effect solidification thereof when cold.

3. The method of producing a disinfectant of the character set forth which consists in commingling tar oil with an alkali to neutralize the free acids thereof, and also with a fat and saponifying or partially saponifying the latter, and thereupon condensing the mixture to effect solidification thereof when cold, the tar oil contained in the finished compound being in excess of the fat.

4. The method of producing a disinfectant of the character set forth which consists in commingling tar oil with an alkali to neutralize the free acids thereof, and also with a fat and saponifying or partially saponifying the latter, and thereupon condensing the mixture to effect solidification thereof when cold, the tar oil constituting substantially seventy-five per cent. of the finished compound.

AXEL FRANCK-PHILIPSON.